United States Patent
Yong

(10) Patent No.: US 10,204,290 B2
(45) Date of Patent: Feb. 12, 2019

(54) DEFECT REVIEW SAMPLING AND NORMALIZATION BASED ON DEFECT AND DESIGN ATTRIBUTES

(71) Applicant: KLA-Tencor Corporation, Milpitas, CA (US)

(72) Inventor: Poh Boon Yong, Milpitas, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 15/426,138

(22) Filed: Feb. 7, 2017

(65) Prior Publication Data

US 2018/0107903 A1 Apr. 19, 2018

Related U.S. Application Data

(60) Provisional application No. 62/408,232, filed on Oct. 14, 2016.

(51) Int. Cl.
*G06K 9/62* (2006.01)
*G06T 7/00* (2017.01)
*G06K 9/46* (2006.01)

(52) U.S. Cl.
CPC .......... *G06K 9/6282* (2013.01); *G06T 7/0004* (2013.01); *G06T 7/0006* (2013.01); *G06K 9/4604* (2013.01); *G06T 2207/10061* (2013.01); *G06T 2207/30148* (2013.01)

(58) Field of Classification Search
USPC .......................................... 382/149; 700/121
See application file for complete search history.

(56) References Cited

U.S. PATENT DOCUMENTS

| 8,560,539 B1* | 10/2013 | Engebretsen ....... G06F 17/3071 707/736 |
| 8,660,340 B2* | 2/2014 | Shibuya ............. G01N 21/9501 382/149 |
| 9,310,320 B2* | 4/2016 | Kurada ............ G01N 21/95607 |
| 9,518,934 B2* | 12/2016 | Chen .................. G01N 21/9501 |
| 9,903,813 B2* | 2/2018 | Amir .................. G01N 21/4785 |
| 2002/0013664 A1* | 1/2002 | Strackeljan .......... G05B 13/027 702/34 |

(Continued)

FOREIGN PATENT DOCUMENTS

JP 2011254084 12/2011

OTHER PUBLICATIONS

ISA/KR, International Search Report and Written Opinion for PCT/US2017/056547 dated Jan. 26, 2018.

(Continued)

*Primary Examiner* — Xuemei Chen
(74) *Attorney, Agent, or Firm* — Hodgson Russ LLP

(57) ABSTRACT

A decision tree and normalized reclassification are used to classify defects. Defect review sampling and normalization can be used for accurate Pareto ranking and defect source analysis. A defect review system, such as a broadband plasma tool, and a controller can be used to bin defects using the decision tree based on defect attributes and design attributes. Class codes are assigned to at least some of the defects in each bin. Normalized reclassification assigns a class code to any unclassified defects in a bin. Additional decision trees can be used if any bin has more than one class code after normalized reclassification.

14 Claims, 8 Drawing Sheets

(56) References Cited

U.S. PATENT DOCUMENTS

| | | | |
|---|---|---|---|
| 2005/0069863 A1* | 3/2005 | Moraleda | C12Q 1/6886 |
| | | | 435/4 |
| 2009/0185493 A1 | 7/2009 | Amini et al. | |
| 2014/0212022 A1 | 7/2014 | Geshel et al. | |
| 2015/0125064 A1 | 5/2015 | Chen et al. | |
| 2015/0234379 A1* | 8/2015 | Vajaria | H01L 22/12 |
| | | | 700/121 |
| 2015/0254832 A1* | 9/2015 | Plihal | G06T 7/001 |
| | | | 382/149 |
| 2015/0262038 A1* | 9/2015 | Konuru | G06T 7/0004 |
| | | | 382/149 |
| 2016/0099848 A1* | 4/2016 | Krynski | H04L 12/6418 |
| | | | 709/224 |
| 2016/0163035 A1* | 6/2016 | Chang | G06K 9/4628 |
| | | | 382/149 |

OTHER PUBLICATIONS

Ng, et al., Automated defect-data analysis allows comprehensive yield management in LED manufacturing, LEDs Magazine, 5 pages May 31, 2011.

* cited by examiner

DEFECT REVIEW SAMPLING AND NORMALIZATION BASED ON DEFECT AND DESIGN ATTRIBUTES

CROSS-REFERENCE TO RELATED APPLICATIONS

This application claims priority to the provisional patent application filed Oct. 14, 2016 and assigned U.S. App. No. 62/408,232, the disclosure of which is hereby incorporated by reference.

FIELD OF THE DISCLOSURE

This disclosure relates to defect detection and classification.

BACKGROUND OF THE DISCLOSURE

Wafer inspection systems help a semiconductor manufacturer increase and maintain integrated circuit (IC) chip yields by detecting defects that occur during the manufacturing process. One purpose of inspection systems is to monitor whether a manufacturing process meets specifications. The inspection system indicates the problem and/or the source of the problem if the manufacturing process is outside the scope of established norms, which the semiconductor manufacturer can then address.

Evolution of the semiconductor manufacturing industry is placing ever greater demands on yield management and, in particular, on metrology and inspection systems. Critical dimensions are shrinking while wafer size is increasing. Economics is driving the industry to decrease the time for achieving high-yield, high-value production. Thus, minimizing the total time from detecting a yield problem to fixing it determines the return-on-investment for the semiconductor manufacturer.

While greater emphasis is being placed on yield management, defect detection on semiconductor wafers can be complicated and time-consuming. Semiconductor manufacturers need improved techniques to detect defects in a faster and more reliable manner.

Review sampling can involve sampling defects from a wafer and sending them to a review system. Once the sampled defects are classified, normalization can be used to estimate the distribution of defect types for all defects. Normalization is a technique of judging defect type representation in all inspected data within a given data set when only a subset of this data is assigned class codes. Normalization can aid in understanding the impact of different defect types on all of the inspected data, especially when defect counts are reasonably large. This can cause the defect classification to be restricted to a sample set. Normalization is used in defect analyses such as defect type Pareto, defect source analysis, or statistical process control (SPC) monitoring.

Traditional review sampling samples defects based on random selection. However, certain high sensitivity inspections inherit the noise and, consequently, many inspected defects are considered to be a nuisance. Therefore, random sampling on noisy defect distribution will create high SNV (SEM non-visual) or no defect found results during review.

Traditional techniques allows normalization based on proportional or non-proportional sample size with respect to total defect count. These techniques use an arithmetic formula to estimate the distribution of unclassified defects to defect class by using the ratio of the number of defects in each class to the total number of classified defects. The results show numerical values instead of assigning individual unclassified defects with a class code. Results of these previous techniques are often inaccurate and do not represent the actual distribution of the defect classes. In the example of a normalized defect type Pareto, inaccurate ranking of a defect class may lead to wrong actions. Also, the normalization results cannot be used in defect-level yield prediction because individual defects cannot be normalized. Individual defects cannot be normalized because normalization involves an arithmetic calculation that uses the proportional percentage of the reviewed and classified defects to estimate the real distribution of the total population.

Therefore, improved defect review sampling and normalization is needed.

BRIEF SUMMARY OF THE DISCLOSURE

In a first embodiment, a system is provided. The system comprises a defect review system and a controller. The defect review system includes a stage configured to hold a wafer and an image generation system configured to generate an image of the wafer. The controller is in electronic communication with the defect review system and is configured to: bin a plurality of defects into a plurality of bins using a decision tree based on defect attributes and design attributes; assign one of one or more class codes to at least some of the defects in each of the bins; and perform normalized reclassification on each of the bins, wherein unclassified defects in the bins are each assigned one of the one or more class codes. Each of the class codes represents a different defect type.

The controller can include a processor, an electronic data storage unit in electronic communication with the processor, and a communication port in electronic communication with the processor and the electronic data storage unit.

The defect review system may be a broadband plasma tool.

The image generation system may be configured to use at least one of an electron beam, a broadband plasma, or a laser to generate the image of the wafer.

One of the bins can include two of the class codes after the normalized reclassification. In this instance, the controller is further configured to: determine that one of the bins includes two of the class codes after the normalized reclassification; bin the defects in the bin with two of the class codes into a plurality of secondary bins using a secondary decision tree based on secondary defect attributes and secondary design attributes; assign one of one or more secondary class codes to at least some of the defects in each of the secondary bins; and perform normalized reclassification on each of the secondary bins, wherein unclassified defects in the secondary bins are each assigned one of the one or more secondary class codes. Each of the secondary class codes represents a different defect type.

The defect attributes can include one or more of attributes extracted from patch image processing algorithms, inspector optical attributes, inspector recipe attributes, wafer level signature attributes, zonal attributes, care area information, metrology attributes, process conditions, process equipment, and user-defined attributes. The design attributes can include one or more of design-based class, design-based grouping, pattern grouping, hotspot grouping, design criticality index, pattern complexity index, and region of interest.

In a second embodiment, a method is provided. The method comprises binning, using a controller, a plurality of defects from a semiconductor wafer into a plurality of bins using a decision tree based on defect attributes and design attributes. Using the controller, one of one or more class codes are assigned to at least some of the defects in each of the bins. Each of the class codes represents a different defect type. Using the controller, normalized reclassification is performed on each of the bins, wherein unclassified defects in the bins are each assigned one of the one or more class codes.

The defect attributes can include one or more of attributes extracted from patch image processing algorithms, inspector optical attributes, inspector recipe attributes, wafer level signature attributes, zonal attributes, care area information, metrology attributes, process conditions, process equipment, and user-defined attributes. The design attributes can include one or more of design-based class, design-based grouping, pattern grouping, hotspot grouping, design criticality index, pattern complexity index, and region of interest.

A number of the defects per bin can be distributed proportionally after the binning.

One of the bins includes two of the class codes after the normalized reclassification. In this instance, using the controller, it is determined that one of the bins includes two of the class codes after the normalized reclassification. Using the controller, the defects in the bin are binned with two of the class codes into a plurality of secondary bins using a secondary decision tree based on secondary defect attributes and secondary design attributes. Using the controller, one of one or more secondary class codes are assigned to at least some of the defects in each of the secondary bins, wherein each of the secondary class codes represents a different defect type. Using the controller, normalized reclassification is performed on each of the secondary bins, wherein unclassified defects in the secondary bins are each assigned one of the one or more secondary class codes.

The method can further comprise inspecting a wafer for defects and communicating the plurality of defects on the wafer to the controller for binning.

In a third embodiment, a non-transitory computer-readable storage medium is provided. The non-transitory computer-readable storage medium comprises one or more programs for executing the following steps on one or more computing devices: bin a plurality of defects from a semiconductor wafer into a plurality of bins using a decision tree based on defect attributes and design attributes; assign one of one or more class codes to at least some of the defects in each of the bins; and perform normalized reclassification on each of the bins, wherein unclassified defects in the bins are each assigned one of the one or more class codes. Each of the class codes represents a different defect type.

A number of the defects per bin can be distributed proportionally after the binning.

The defect attributes can include one or more of attributes extracted from patch image processing algorithms, inspector optical attributes, inspector recipe attributes, wafer level signature attributes, zonal attributes, care area information, metrology attributes, process conditions, process equipment, and user-defined attributes. The design attributes can include one or more of design-based class, design-based grouping, pattern grouping, hotspot grouping, design criticality index, pattern complexity index, and region of interest.

One of the bins can include two of the class codes after the normalized reclassification. In this instance, the non-transitory computer-readable storage medium comprises one or more programs for executing the following steps on one or more computing devices: determine that one of the bins includes two of the class codes after the normalized reclassification; bin the defects in the bin with two of the class codes into a plurality of secondary bins using a secondary decision tree based on secondary defect attributes and secondary design attributes; assign one of one or more secondary class codes to at least some of the defects in each of the secondary bins; and perform normalized reclassification on each of the secondary bins, wherein unclassified defects in the secondary bins are each assigned one of the one or more secondary class codes. Each of the secondary class codes represents a different defect type.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein enable defect review sampling and normalization based on defect and design attributes for accurate Pareto ranking and defect source analysis. Defect review sampling and normalization may be based on defect and design attributes using a decision tree. Defect review using the systems and methods disclosed herein may be more accurate than traditional normalization techniques. For example, a more accurate Pareto analysis may be generated because normalized reclassification can more accurately assign class codes to unclassified defects than traditional normalization techniques. Due to the increased binning accuracy, a user may focus on addressing the most important defects without inadvertently taking action on the wrong type of defects. A user also may be able to take action to address defect sources because of the more accurate Pareto analysis.

Embodiments disclosed herein allow more accurate representation of the defect-class distribution on wafers based on reviewed and classified defects. The more accurate defect-type Pareto analysis can help a user take action on identified defects that are likely to make the largest impact. Defect source analysis (DSA) and type-source Pareto analysis can be performed using the results of the defect review sampling and normalization. In addition, yield prediction with the more accurate defect-class distribution will be more accurate in predicting yield limiting factors.

Figure 1:
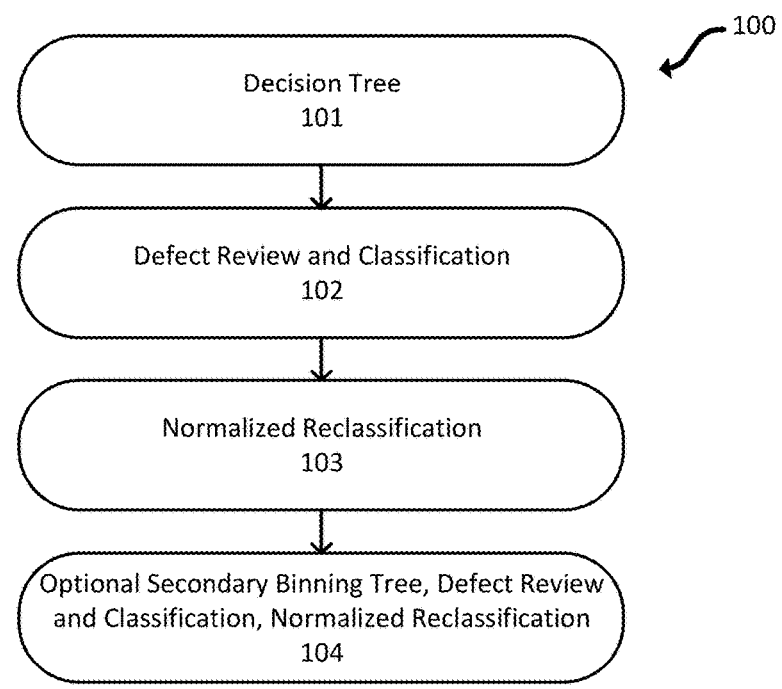
FIG. 1 is flowchart of an embodiment of a method in accordance with the present disclosure.

FIG. 1 is flowchart of an embodiment of a method 100. A wafer is inspected for defects or defects on a wafer are obtained. For example, a plurality of defects on the wafer may be communicated, such as to a controller, for classification. In another example, a plurality of defects are represented digitally and stored on an electronic storage device (such as a hard drive). The plurality of defects may be sourced from one or more wafers and from one or more designs. The plurality of defects may be retrieved, through an electronic network, by a processor for classification. First, the defects are binned using a decision tree 101. The decision tree may be a hierarchical structure constructed based on defect and design attributes. In one example, binning effectively separates the defects detected on a wafer into groups of defects that are located in different regions of interest in the device being formed on the wafer. Defects that are located in the regions of interest are, therefore, potential defects of interest (DOIs).

Second, defects are reviewed and classified 102, such as by applying review sampling rules. This can be used to identify defects that should be further reviewed. This step may also include determining if the potential DOIs are actually DOIs by classifying the defects. Defect review and classification 102 can be manual, automated, or a combination thereof. The results of this step may be used to identify which regions of interest exhibit pattern-dependent defects. In this manner, the results of this step may be used to identify the region or regions of interest in the device design that are potentially more problematic (e.g., more prone to systematic defects). In an instance, the selection of the defect and design attributes and partition of the decision tree can be based on a user's manufacturing or other technical knowledge. In another instance, the selection of the defect and design attributes and partition of the decision tree can be based on a machine learning engine. For example, a machine learning engine can model and learn from all historical defect information including defect and design attributes, which can help to increase the accuracy and speed of defect discovery. Inspected defects are categorized into bins based on the defect and design attribute values. The number of defects per bin may be distributed proportionally. For example, inspected defects may be categorized into bins based on previous classifications for a particular tool, process, wafer, or design. In an instance, the number of defects per bin may be distributed based on a known Pareto analysis or known results for a particular tool, process, wafer, or design. Thus, previous knowledge can be a benchmark applied to an inspection.

Once at least some sample defects are reviewed and classified by one or more review tools, normalized reclassification 103 is performed, which may assign a class code to each unclassified defect in a bin. If the review sampling bin has only one class, then the rest of unclassified defects will be re-classified to be that class.

The rest of the unclassified defects can be randomly assigned to a class if the review sampling bin has multiple classes. In an instance, assignment of unclassified defects into multiple class codes in a single review sample bin can be based on a proportion of the classified defects. For example, a defect review of 200 defects out of 700 defects in a review sample bin assigns class code B to 150 defects and class code C to 50 defects. The remaining 500 unclassified defects are then randomly assigned the class code B or C. In this example, 375 unclassified defects are assigned class code B and 125 unclassified defects are assigned class code C. In this manner it is possible in the results to have a fraction of a defect assigned to a class.

If there are multiple classifications per review sampling bin after normalized reclassification, the review sampling bin can optionally be further segregated into finer review sampling bins with a secondary decision tree (e.g., an exhaustive segregation tree), defect review and classification, and normalized reclassification 103. This can purify the results. The secondary decision tree can use defect and design attributes, which may be the same as or different from the primary decision tree. Steps 101, 102, and 103 may be repeated one or more times for more granular binning, which is reflected in optional step 104.

The method 100 may stop only when each bin has only a single defect class. Unclassified defects that are deemed to exhibit the same characteristics in the same branch may be classified in the decision tree as the defect class of the bin. Thus, there may be a tertiary sampling decision tree, quaternary sampling decision tree, etc. after the secondary decision tree. Bins with children are parent bins, and child bins may share character their parent bins. After normalized reclassification, each unclassified defect may have a defect class based on normalization.

Figure 2:
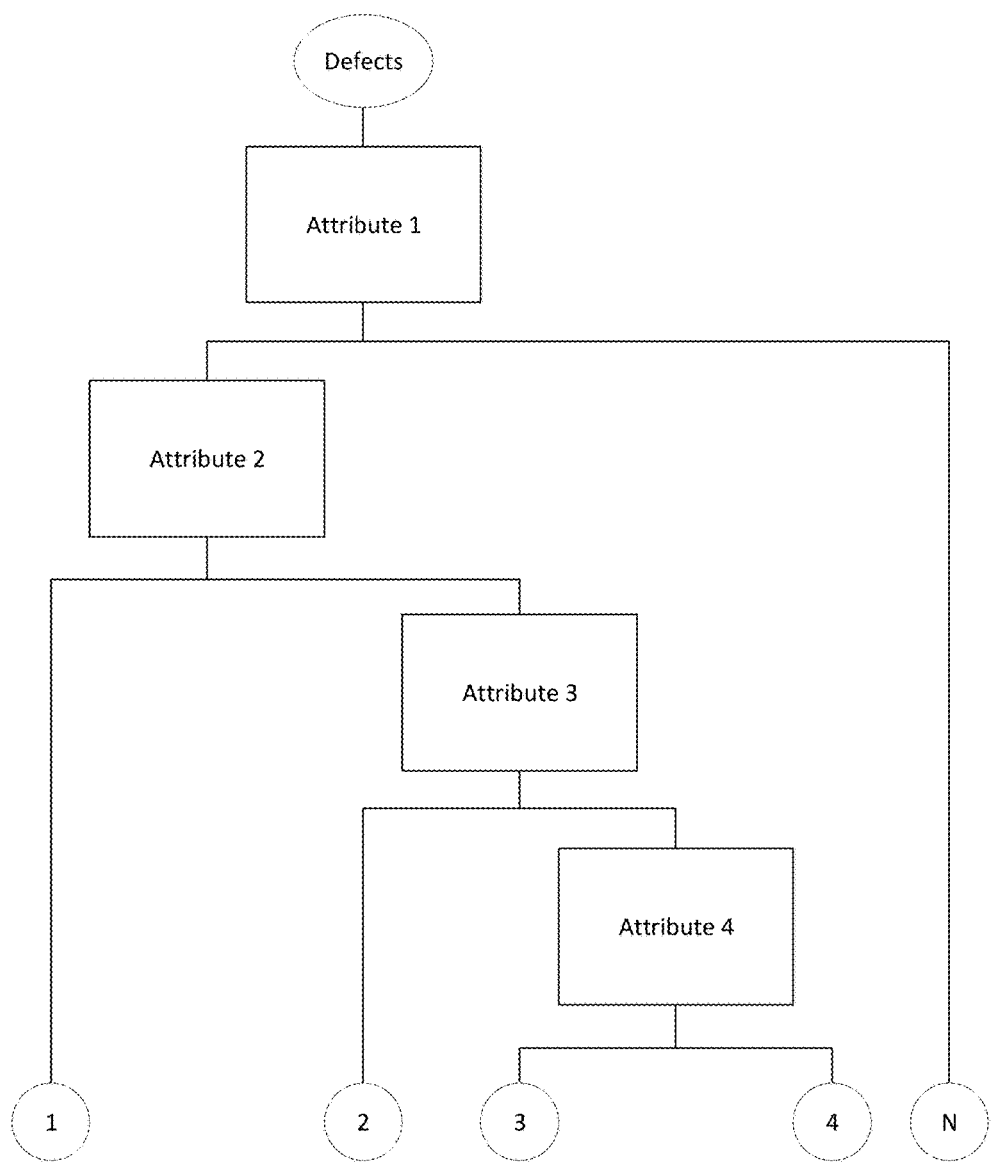
FIG. 2 is a diagram illustrating an exemplary decision tree in accordance with the present disclosure.

FIG. 2 is a diagram illustrating a decision tree. Defects are sent to the decision tree seen in FIG. 2 for classification. Each defect is assigned a bin (circles 1, 2, 3, 4, N) based on attributes (Attributes 1, 2, 3, 4). While four attributes and five bins are illustrated, the decision tree may have more or fewer bins or attributes. For example, a decision tree may have 10, 15, 20, 25, 50, or 100 bins. The number of bins (or levels) in a decision tree can vary with the application. While there is no upper limit to the number of bins (or levels) in a decision tree as disclosed herein, a user may try to simplify the decision tree. For example, the branches of the decision tree may be pruned to remove redundant bins. However, more complicated decision trees may provide finer segregation of defects.

The attributes may be defect attributes or design attributes. Defect attributes can include one or more of attributes extracted from patch image processing algorithms, inspector optical attributes, inspector recipe attributes, wafer level signature attributes, zonal attributes, care area information, metrology attributes, process conditions, process equipment, and user-defined attributes. Design attributes can include one or more of design-based class, design-based grouping, pattern grouping, hotspot grouping, design criticality index, pattern complexity index, and region of interest. Other defect and design attributes are possible and these are merely listed as examples. Attributes may be selected by machine learning, by a user, or by a combination thereof.

In an example, Attribute 1 is defect source analysis. Adder defects (e.g., newly added defects) are sent to Attribute 2 and common defects (e.g., defects common to multiple inspections) are sent along the path leading to bin N. Attribute 2 is whether the defects repeats across the wafer. Repeating defects are sent to bin 1 and non-repeating defects are sent to Attribute 3. Attribute 3 evaluates clustering. Clustered defects are sent to bin 2 and random defects are sent to Attribute 4. Attribute 4 is a size analysis. Large defects are sent to bin 3 and small defects are sent to bin 4.

Figure 3:
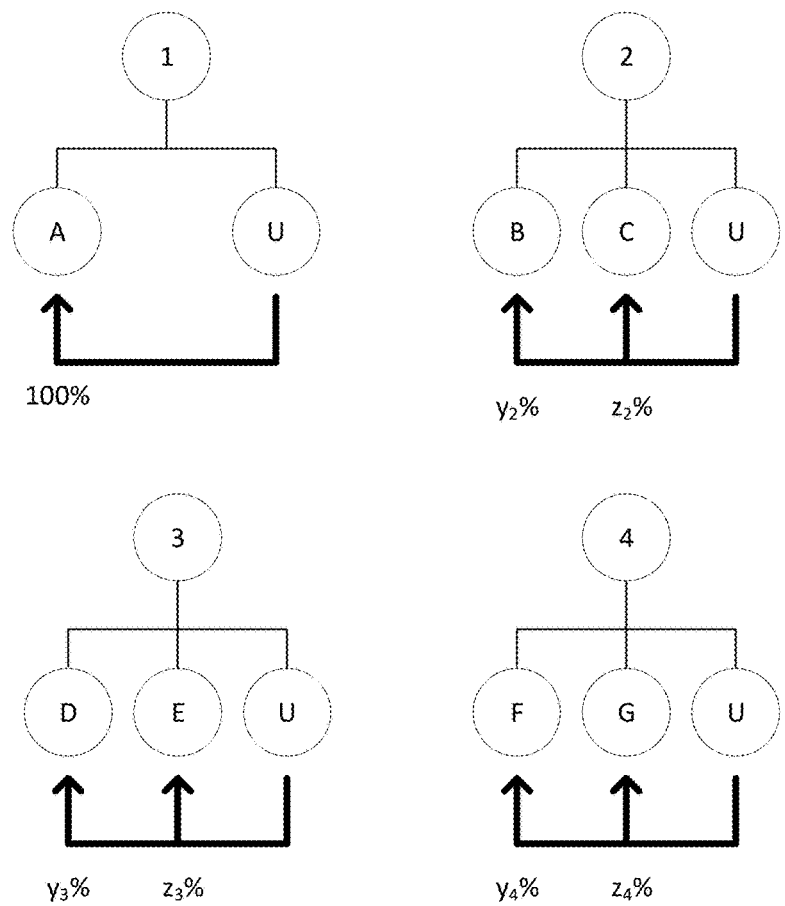
FIG. 3 is a diagram illustrating classification and normalized reclassification based on the decision tree of FIG. 2 in accordance with the present disclosure.

FIG. 3 is a diagram illustrating classification and normalized reclassification based on the decision tree of FIG. 2.

Some of the defects in each bin (1, 2, 3, 4) are assigned a class code (A-G) while a remainder are unclassified (U). Each class code can represent a different type of defect. As seen in FIG. 3, bin 1 only has a single class code while bins 2, 3, and 4 have two class codes. The percentage of defects in each bin that are classified through inspection can vary by user or application.

After at least some defects are assigned a class code, normalized reclassification is performed on unclassified defects in each bin. Each of the unclassified defects in a bin is assigned one of the class codes. In FIG. 3, 100% of unclassified defects in bin 1 are assigned class code A. Other bins have more than one class code, and the unclassified defects are divided between the two class codes using normalized reclassification. Thus, $y_2$% of unclassified defects are assigned class code B and $z_2$% of unclassified defects are assigned class code C in bin 2, $y_3$% of unclassified defects are assigned class code D and $z_3$% of unclassified defects are assigned class code E in bin 3, and $y_4$% of unclassified defects are assigned class code F and $z_4$% of unclassified defects are assigned class code G in bin 4. In these examples, $y_n$% and $z_n$% for a bin each can be from greater than 0% to less than 100%, wherein the sum of $y_n$% and $z_n$% equals 100%. Division of unclassified defects between different class codes may be proportional to the percentages of classified defects of each class code in a bin, with the unclassified defects being randomly assigned a class code. Additional levels in the decision tree can be used to further purify a bin.

In another example, a bin has more than two class codes (e.g., three or four class codes). In this case, the unclassified defects are assigned one of the class codes in the bin based on normalized reclassification. The percentages of unclassified defects assigned to each class code can range from greater than 0% to less than 100%, but the sum of each of the constituent percentages equals 100%. Division of unclassified defects between different class codes may be proportional to the percentages of classified defects of each class code in a bin, with the unclassified defects being randomly assigned a class code. Additional levels in the decision tree can be used to further purify a bin.

Figure 4:
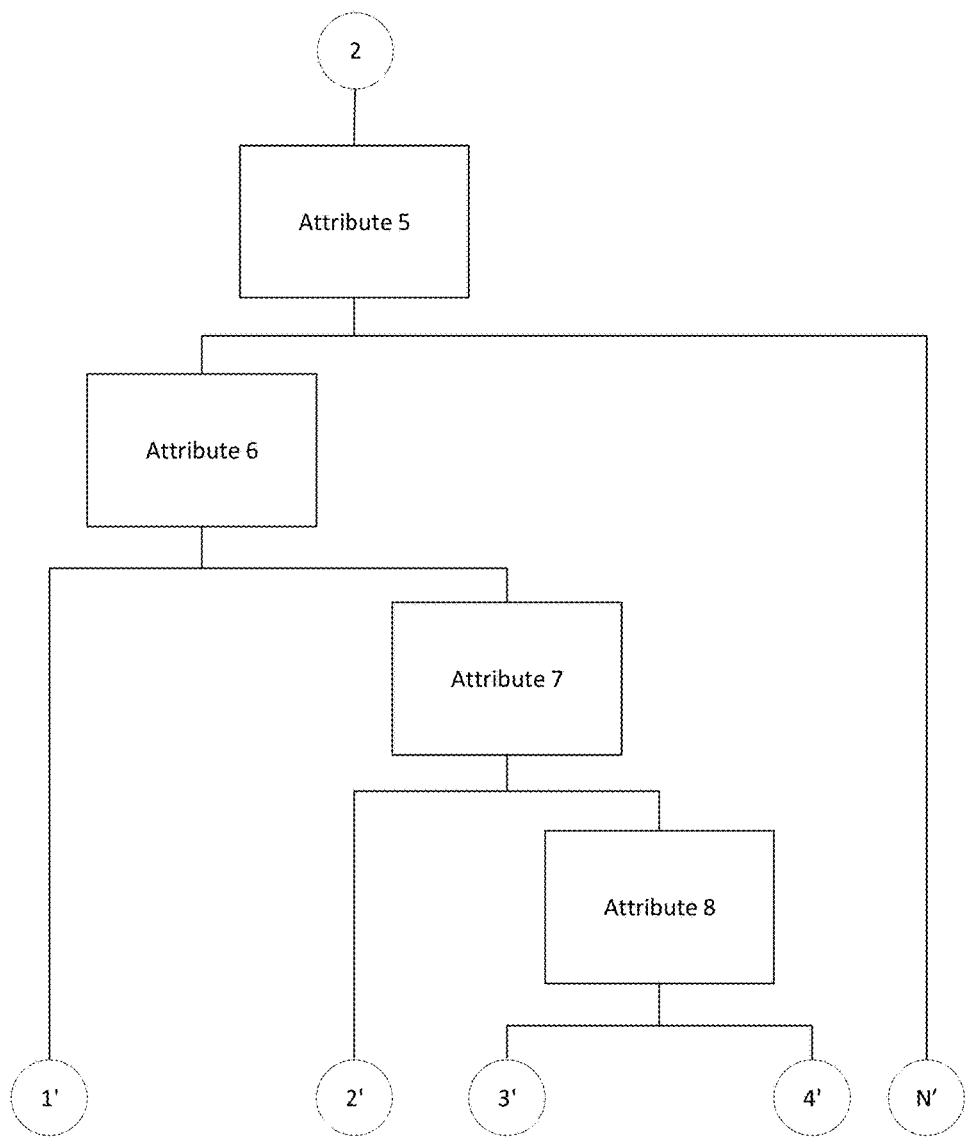
FIG. 4 is a diagram illustrating an exemplary secondary decision tree in accordance with the present disclosure.

FIG. 4 is a diagram illustrating a secondary decision tree. As seen in FIG. 3, bin 2 had class codes B and C after normalized reclassification. The system can determine that one of the bins includes two class codes after normalized reclassification. So that each bin has only one classification code, the defects in bin 2 are assigned bins (circles 1', 2', 3', 4', N') based on attributes (Attributes 5-8) in the secondary decision tree of FIG. 4. While four attributes and five bins are illustrated, the secondary decision tree may have more or fewer bins or attributes. Each of the bins in FIG. 3 that includes more than two class codes after normalized reclassification can have its own secondary decision tree (e.g., a tertiary decision tree).

Figure 5:
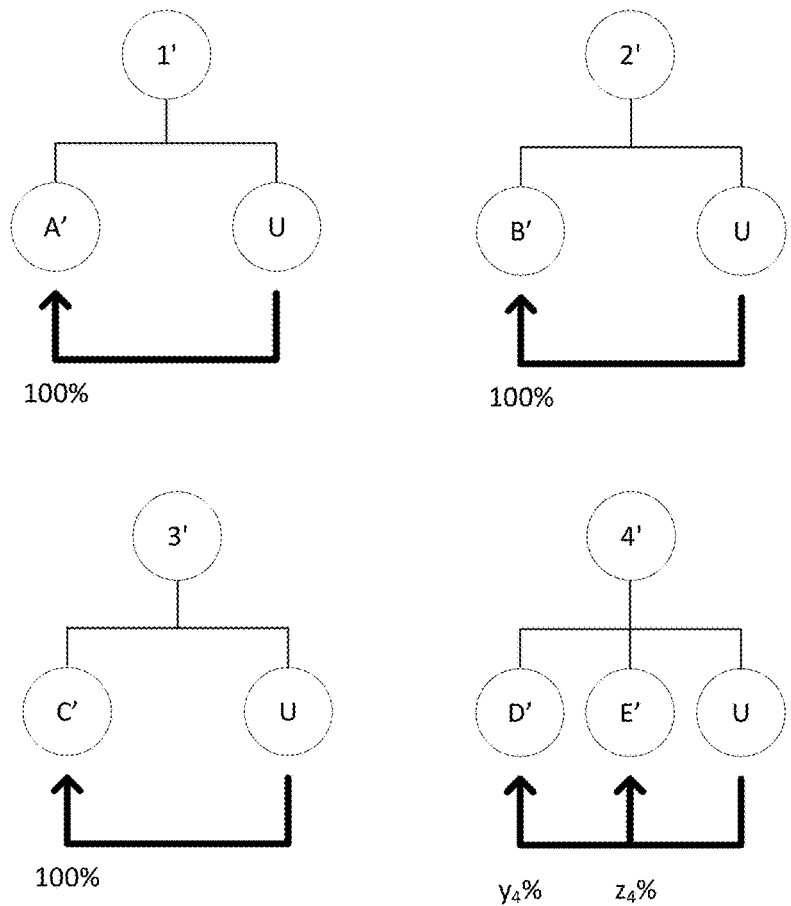
FIG. 5 is a diagram illustrating classification and normalized reclassification based on the secondary decision tree of FIG. 4 in accordance with the present disclosure.

FIG. 5 is a diagram illustrating classification and normalized reclassification based on the secondary decision tree of FIG. 4. Each of the unclassified defects in a bin is assigned one of the class codes. In FIG. 5, 100% of unclassified defects in bin 1' are assigned class code A', 100% of unclassified defects in bin 2' are assigned class code B', and 100% of unclassified defects in bin 3' are assigned class code C'.

In the secondary decision tree of FIG. 5, bin 4' includes more than one class code, and the unclassified defects are divided between the two class codes using normalized reclassification. Thus, $y_4$% of unclassified defects are assigned class code D' and $z_4$% of unclassified defects are assigned class code E' in bin 4'. In this example, $y_n$% and $z_n$% for a bin each can be from greater than 0% to less than 100%, wherein the sum of $y_n$% and $z_n$% equals 100%. Division of unclassified defects between different class codes may be proportional to the percentages of classified defects of each class code in a bin, with the unclassified defects being randomly assigned a class code. Additional levels in the decision tree can be used to further purify a bin.

After normalized reclassification, bin 4' includes two class codes. So that each bin has only one classification code, a tertiary decision tree may be used with the defects in bin 4'. The tertiary decision tree may operate similar to the secondary decision tree of FIGS. 4-5.

One possible result is that all defects are assigned a class code and no bin has more than one class code after normalized reclassification. The attributes in the decision trees can be adjusted as-needed.

Alternatively, one or more bins may contain multiple class codes after normalized reclassification. The system may automatically add another level to the decision tree to further purify the defects in the bin. The system or a user also can determine that purity of the defects in the bin is sufficient and that no further segregation of defects in a particular bin is necessary.

Review sample bins can be created to allow non-proportional normalization based on each sample bin for each defect class.

Any results after normalized reclassification can be fed to a machine learning engine that can model and learn from defect information. This can help increase accuracy and speed of defect discovery. For example, the machine learning engine can be used to show a link between defect and design attributes and SNV classifications.

The machine learning engine can use historical data to build a predictive model or decision tree. The machine learning engine may first build a model based on data mining techniques. The output is predictive model or decision tree depending on the techniques. Also, the model can show the importance of the attributes with respect to the defect information. In an instance, the model or decision tree can assign each defect to a review sample bin when a new inspection arrives. The machine learning engine can also learn and improve over time based on new data. Whenever the new inspection is classified, the data can be stored back to the historical dataset and the model can be re-trained.

Figure 7:
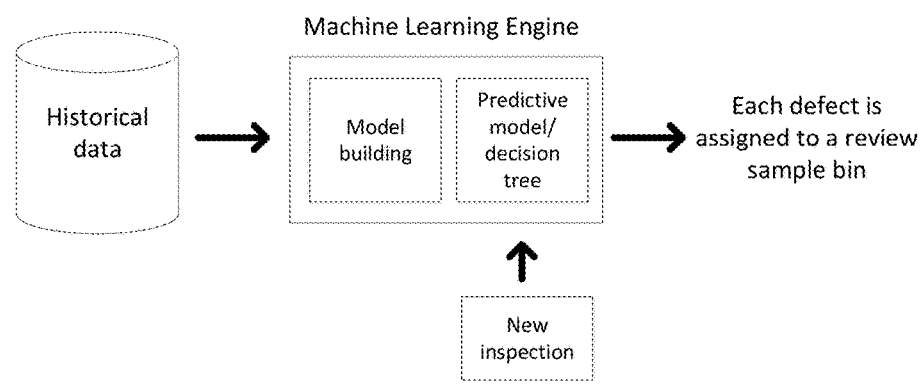
FIG. 7 is a block diagram of an embodiment of a machine learning engine in accordance with the present disclosure.

FIG. 7 is a block diagram of an embodiment of a machine learning engine. Historical data is fed into the machine learning engine, which includes both model building and predictive model/decision tree components. New inspections are fed into the predictive model/decision tree component. Each defect in is assigned to a review sample bin using the machine learning engine.

When there are new incoming DOIs, the model can rank and prioritize the DOIs. If certain DOIs have features that show significant differences in a statistical or mathematical sense, then the DOIs can be sampled to be reviewed, for example, in an electron beam review tool.

Machine learning also can be used to re-classify a defect based on BBP attributes, including design attributes for yield prediction or killer defect identification. For example, a decision tree can be configured to identify killer defects or a user or the machine learning engine can identify bins that contain killer defects. A killer defect may cause a malfunction or failure of the semiconductor device, whereas non-killer defects do not substantially affect the performance of the semiconductor device. For example, killer defects may be a) of sub-micron size, b) short elements of a single mask level (such as metal or gate-stack runners) together, or create opens at these same levels, and c) can be detected using in-line inspection tools such as an inspection SEM.

Deep analytics also can be used to show a link between design variability and process variability based on a defect. Fault Detection and Classification (FDC) data can be used to identify potential hotspots for defect inspection.

Figure 8:
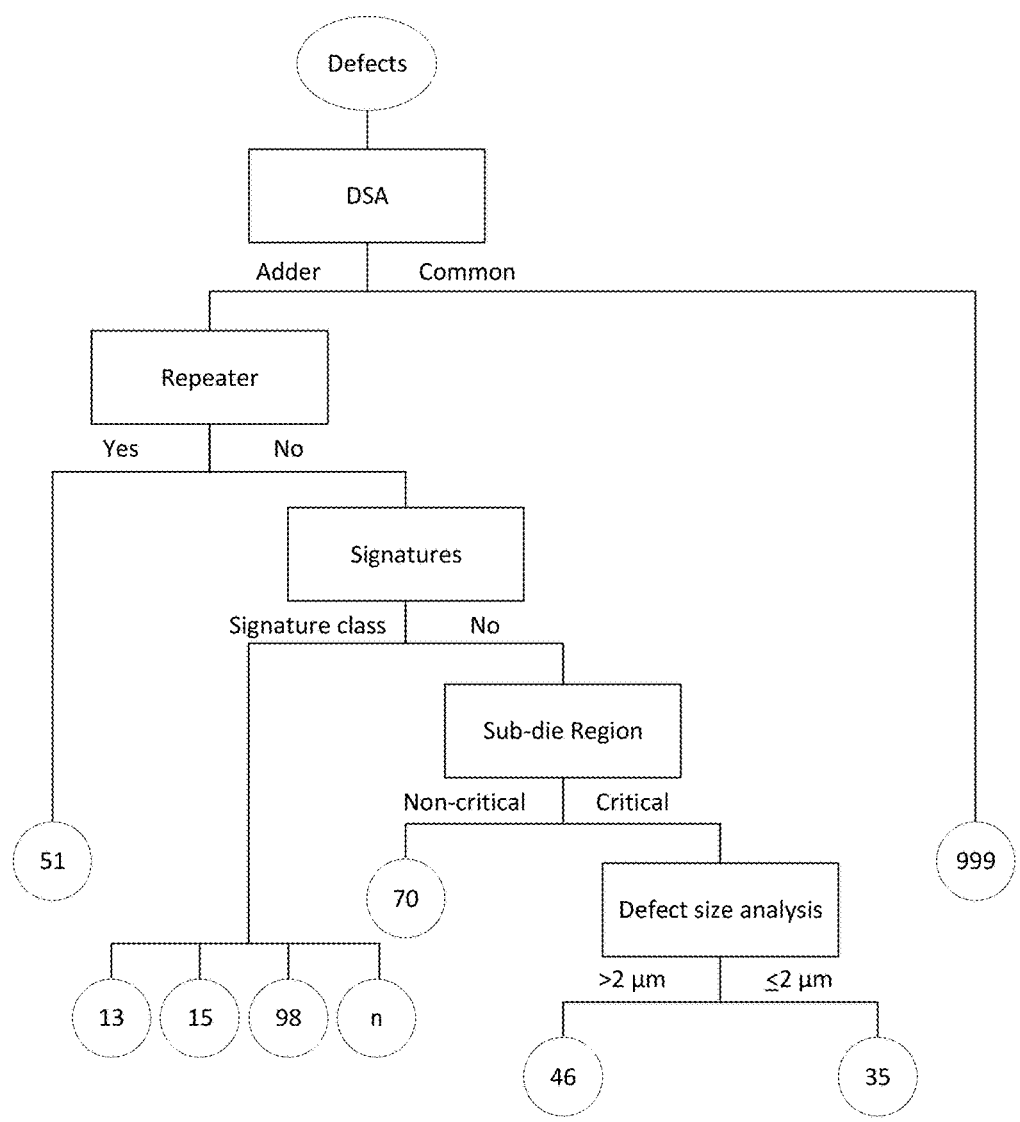
FIG. 8 is a diagram illustrating an exemplary decision tree binning defects on a wafer.

FIG. 8 is a diagram illustrating an exemplary decision tree binning defects on a wafer. The defects are reviewed at attribute 1, which is DSA. The numbers of defects in this example are exemplary and are used for ease of understanding. Some defects (999 in this example) are listed as common, which either are binned or can be further segregated. Adder defects are then segregated at attribute 2, which is whether or not the defects repeat. 51 defects repeat and the remainder do not. Attribute 3 is signatures. Multiple defects have a signature class (13, 15, 98, n), which are each assigned a class code. Attribute 4 is whether the defect is related to a sub-die region. 70 defects are non-critical and the remainder are critical. Critical defects are evaluated at attribute 5, which is a defect size analysis. 46 defects are greater than 2 µm and 35 defects are less than or equal to 2 µm. Any of the bins with multiple class codes (e.g., signature class) can be further segregated with an additional level of the decision tree.

Figure 6:
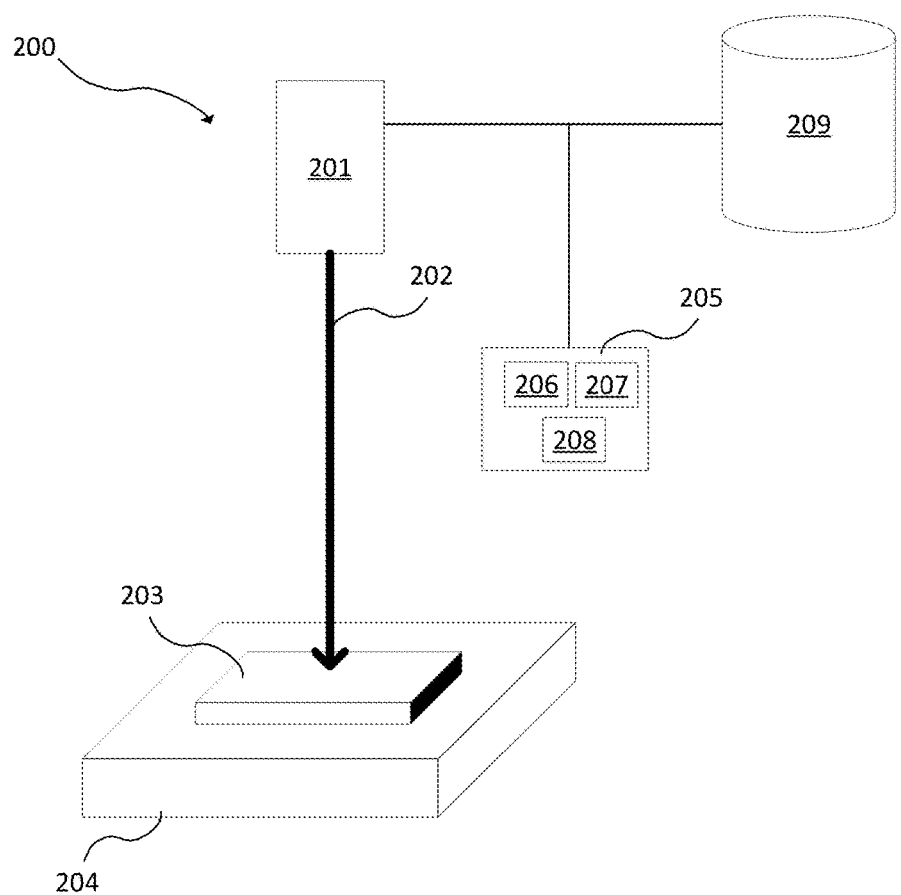
FIG. 6 is a block diagram of an embodiment of a system in accordance with the present disclosure.

FIG. 6 is a block diagram of a system in accordance with the present disclosure. A controller 205 is in electronic communication with a defect review system 200 and/or a server 209.

The defect review system 200 includes a stage 204 configured to hold a wafer 203 or other workpiece. The stage 204 may be configured to move or rotate in one, two, or three axes. The defect review system 200 also includes an image generation system 201 configured to generate an image of a surface of the wafer 203. The image may be for a particular layer or region of the wafer 203. In this example, the image generation system 201 produces a broadband plasma (BBP) 202 to generate an image of the wafer 203. Other image generation systems 201 are possible, such as those that use electron beam or laser scanning. For example, dark field imaging or bright field imaging can be performed by the image generation system 201. The defect review system 200 and/or image generation system 201 can generate an image of the wafer 203.

Broadband plasma light sources can be used for various applications. A plasma is generated inside the enclosure with a gas mixture. Radiation generated as a result of the plasma discharge is optically coupled to the wafer 203 located outside the enclosure. The enclosure may be part of a discharge lamp.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

Other types of wafers also may be used. For example, the wafer may be used to manufacture LEDs, solar cells, magnetic discs, flat panels, or polished plates. Defects on other objects also may be classified using techniques and systems disclosed herein.

In a particular example, the defect review system 200 is part of or is a BBP tool. Images of the wafer 203 are generated by scanning the wafer 203 with BBP 202.

The server 209 may be configured to store design images for semiconductor wafers or other workpieces. The server 209 also can be or can include connected to a machine learning engine.

The defect review system 200 and the server 209 can communicate with the controller 205. For example, the controller 205 can communicate with the image generation system 201 or other components of the defect review system 200. The controller 205 can include a processor 206, an electronic data storage unit 207 in electronic communication with the processor 206, and a communication port 208 in electronic communication with the processor 206 and electronic data storage unit 207. It is to be appreciated that the controller 205 may be implemented in practice by any combination of hardware, software, and firmware. Also, its functions as described herein may be performed by one unit, or divided up among different components, each of which may be implemented in turn by any combination of hardware, software, and firmware. Program code or instructions for the controller 205 to implement the various methods and functions described herein may be stored in controller readable storage media, such as a memory in the electronic data storage unit 207, within the controller 205, external to the controller 205, or combinations thereof.

The controller 205 may be coupled to the components of the defect review system 200 or server 209 in any suitable manner (e.g., via one or more transmission media, which may include "wired" and/or "wireless" transmission media) such that the controller 205 can receive the output generated by the defect review system 200, such as output from the imaging device 201 or output generated by the server 209. The controller 205 may be configured to perform a number of functions using the output. For instance, the controller 205 may be configured to review and perform normalized reclassification of defects on the wafer 203 using the output. In another example, the controller 205 may be configured to send the output to an electronic data storage unit 207 or another storage medium without performing defect review or normalized reclassification on the output. The controller 205 may be further configured as described herein, such as to perform the embodiments of FIG. 1, FIGS. 2-5, or FIG. 8. The controller 205 also may be configured to send instructions to a review, inspection, or metrology tool for sampling, imaging, inspection, or metrology purposes.

The controller 205, other system(s), or other subsystem(s) described herein may take various forms, including a personal computer system, image computer, mainframe computer system, workstation, network appliance, internet appliance, or other device. In general, the term "controller" may be broadly defined to encompass any device having one or more processors that executes instructions from a memory medium. The subsystem(s) or system(s) may also include any suitable processor known in the art, such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

Program instructions implementing methods such as those described herein may be stored on computer-readable medium, such as in the electronic data storage unit 207 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Controller 205 may be configured according to any of the embodiments described herein. For example, the controller 205 may be programmed to perform some or all of the steps of FIG. 1.

An additional embodiment relates to a non-transitory computer-readable medium storing program instructions executable on a controller for performing a computer-implemented method for classifying defects, as disclosed herein. In particular, as shown in FIG. 6, electronic data storage unit 207 or other storage medium may contain non-transitory computer-readable medium that includes program instructions executable on the controller 205. The computer-implemented method may include any step(s) of any method(s) described herein.

In an instance, a non-transitory computer-readable storage medium comprises one or more programs for executing the following steps on one or more computing devices. A plurality of defects are binned into a plurality of bins using a decision tree based on defect attributes and design attributes. One of one or more class codes are assigned to at least some of the defects in each of the bins. Each of the class codes represents a different defect type. Normalized reclassification is performed on each of the bins. Unclassified defects in the bins are each assigned one of the one or more class codes.

If one of the bins includes two of the class codes after the normalized reclassification, it is determined that one of the bins includes two of the class codes after the normalized reclassification. The defects in the bin with two of the class codes are binned into a plurality of secondary bins using a secondary decision tree based on secondary defect attributes and secondary design attributes. One of one or more secondary class codes is assigned to at least some of the defects in each of the secondary bins. Each of the secondary class codes represents a different defect type. Normalized reclassification is performed on each of the secondary bins. Unclassified defects in the secondary bins are each assigned one of the one or more secondary class codes.

While disclosed as part of a defect review system, the controller 205 described herein may be configured for use with inspection systems. In another embodiment, the controller 205 described herein may be configured for use with a metrology system. Thus, the embodiments as disclosed herein describe some configurations for classification that can be tailored in a number of manners for systems having different imaging capabilities that are more or less suitable for different applications.

Each of the steps of the method may be performed as described further herein. The methods also may include any other step(s) that can be performed by the controller and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:
1. A system comprising:
  a defect review system, wherein the defect review system includes:
    a stage configured to hold a wafer; and
    an image generation system configured to generate an image of the wafer, wherein the image generation system includes at least one of an electron beam source, a broadband plasma source, a laser source, or a lamp; and
  a controller in electronic communication with the defect review system, wherein the controller includes a processor, an electronic data storage unit in electronic communication with the processor, and a communication port in electronic communication with the processor and the electronic data storage unit, wherein the controller is configured to:
    bin a plurality of defects into a plurality of bins using a decision tree based on defect attributes and design attributes;
    assign one of one or more class codes to at least some of the defects in each of the bins thereby resulting in classified defects, wherein each of the class codes represents a different defect type, and wherein unclassified defects remain after the one or more class codes are applied; and
    perform normalized reclassification on each of the bins with the unclassified defects, wherein each of the unclassified defects in the bins is assigned one of the one or more class codes of its respective bin by randomly assigning one of the one or more class codes to each of the unclassified defects according to a ratio of each quantity of the classified defects assigned the one or more class codes in the bin that contains the unclassified defect.

2. The system of claim 1, wherein the image generation system includes the broadband plasma source, and wherein the defect review system is a broadband plasma tool.

3. The system of claim 1, wherein one of the bins includes two of the class codes after the normalized reclassification, and wherein the controller is further configured to:

determine that one of the bins includes two of the class codes after the normalized reclassification;

bin the defects in the bin with two of the class codes into a plurality of secondary bins using a secondary decision tree based on secondary defect attributes and secondary design attributes;

assign one of one or more secondary class codes to at least some of the defects in each of the secondary bins thereby resulting in the classified defects in the secondary bins, wherein each of the secondary class codes represents a different defect type, and wherein the unclassified defects remain in at least one of the secondary bins after the one or more secondary class codes are applied; and perform normalized reclassification on each of the secondary bins with the unclassified defects, wherein each of the unclassified defects in the secondary bins is assigned one of the one or more secondary class codes of its respective bin by randomly assigning one of the one or more secondary class codes to each of the unclassified defects in the secondary bin according to a ratio of each quantity of the classified defects assigned the one or more secondary class codes in the secondary bin that contains the unclassified defect.

4. The system of claim 1, wherein the defect attributes include one or more of attributes extracted from patch image processing algorithms, inspector optical attributes, inspector recipe attributes, wafer level signature attributes, zonal attributes, care area information, metrology attributes, process conditions, process equipment, and user-defined attributes, and wherein the design attributes include one or more of design-based class, design-based grouping, pattern grouping, hotspot grouping, design criticality index, pattern complexity index, and region of interest.

5. The system of claim 1, wherein the controller is configured to proportionally distribute a number of the defects per bin after the binning.

6. A method comprising:
binning, using a controller, a plurality of defects from a semiconductor wafer into a plurality of bins using a decision tree based on defect attributes and design attributes, wherein the controller includes a processor, an electronic data storage unit in electronic communication with the processor, and a communication port in electronic communication with the processor and the electronic data storage unit;

assigning, using the controller, one of one or more class codes to at least some of the defects in each of the bins thereby resulting in classified defects, wherein each of the class codes represents a different defect type, and wherein unclassified defects remain after the one or more class codes are applied; and performing, using the controller, normalized reclassification on each of the bins with the unclassified defects, wherein each of the unclassified defects in the bins is assigned one of the one or more class codes of its respective bin by randomly assigning one of the one or more class codes to each of the unclassified defects according to a ratio of each quantity of the classified defects assigned the one or more class codes in the bin that contains the unclassified defect.

7. The method of claim 6, wherein the defect attributes include one or more of attributes extracted from patch image processing algorithms, inspector optical attributes, inspector recipe attributes, wafer level signature attributes, zonal attributes, care area information, metrology attributes, process conditions, process equipment, and user-defined attributes, and wherein the design attributes include one or more of design-based class, design-based grouping, pattern grouping, hotspot grouping, design criticality index, pattern complexity index, and region of interest.

8. The method of claim 6, wherein a number of the defects per bin is distributed proportionally after the binning.

9. The method of claim 6, wherein one of the bins includes two of the class codes after the normalized reclassification, and further comprising:
determining, using the controller, that one of the bins includes two of the class codes after the normalized reclassification;

binning, using the controller, the defects in the bin with two of the class codes into a plurality of secondary bins using a secondary decision tree based on secondary defect attributes and secondary design attributes;

assigning, using the controller, one of one or more secondary class codes to at least some of the defects in each of the secondary bins thereby resulting in the classified defects in the secondary bins, wherein each of the secondary class codes represents a different defect type, and wherein the unclassified defects remain in at least one of the secondary bins after the one or more secondary class codes are applied; and performing, using the controller, normalized reclassification on each of the secondary bins with the unclassified defects, wherein each of the unclassified defects in the secondary bins is assigned one of the one or more secondary class codes of its respective bin by randomly assigning one of the one or more secondary class codes to each of the unclassified defects in the secondary bin according to a ratio of each quantity of the classified defects assigned the one or more secondary class codes in the secondary bin that contains the unclassified defect.

10. The method of claim 6, further comprising inspecting a wafer for defects and communicating the plurality of defects on the wafer to the controller for binning.

11. A non-transitory computer-readable storage medium, comprising one or more programs for executing the following steps on one or more computing devices:
binning a plurality of defects from a semiconductor wafer into a plurality of bins using a decision tree based on defect attributes and design attributes;

assigning one of one or more class codes to at least some of the defects in each of the bins thereby resulting in classified defects, wherein each of the class codes represents a different defect type, and wherein unclassified defects remain after the one or more class codes are applied; and performing normalized reclassification on each of the bins with the unclassified defects, wherein each of the unclassified defects in the bins is assigned one of the one or more class codes of its respective bin by randomly assigning one of the one or more class codes to each of the unclassified defects according to a ratio of each quantity of the classified defects assigned the one or more class codes in the bin that contains the unclassified defect.

12. The non-transitory computer-readable storage medium of claim 11, wherein a number of the defects per bin is distributed proportionally after the binning.

13. The non-transitory computer-readable storage medium of claim 11, wherein the defect attributes include one or more of attributes extracted from patch image processing algorithms, inspector optical attributes, inspector recipe attributes, wafer level signature attributes, zonal attributes, care area information, metrology attributes, process conditions, process equipment, and user-defined attributes, and wherein the design attributes include one or more of design-based class, design-based grouping, pattern grouping, hotspot grouping, design criticality index, pattern complexity index, and region of interest.

14. The non-transitory computer-readable storage medium of claim 11, wherein one of the bins includes two of the class codes after the normalized reclassification, and further comprising one or more programs for executing the following steps on one or more computing devices:

determining that one of the bins includes two of the class codes after the normalized reclassification;

binning the defects in the bin with two of the class codes into a plurality of secondary bins using a secondary decision tree based on secondary defect attributes and secondary design attributes;

assigning one of one or more secondary class codes to at least some of the defects in each of the secondary bins thereby resulting in the classified defects in the secondary bins, wherein each of the secondary class codes represents a different defect type, and wherein the unclassified defects remain in at least one of the secondary bins after the one or more secondary class codes are applied; and performing normalized reclassification on each of the secondary bins with the unclassified defects, wherein each of the unclassified defects in the secondary bins is assigned one of the one or more secondary class codes of its respective bin by randomly assigning one of the one or more secondary class codes to each of the unclassified defects in the secondary bin according to a ratio of each quantity of the classified defects assigned the one or more secondary class codes in the secondary bin that contains the unclassified defect.

\* \* \* \* \*